(12) United States Patent
Fukumoto (10) Patent No.: US 8,037,760 B2
(45) Date of Patent: Oct. 18, 2011

(54) INERTIAL SENSOR AND ELECTRICAL OR ELECTRONIC DEVICE

(75) Inventor: Koji Fukumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 642 days.

(21) Appl. No.: 12/059,592

(22) Filed: Mar. 31, 2008

(65) Prior Publication Data

US 2008/0245148 A1    Oct. 9, 2008

(30) Foreign Application Priority Data

Apr. 3, 2007 (JP) ................................. 2007-097179

(51) Int. Cl.
*G01P 3/04* (2006.01)
*G01P 15/125* (2006.01)
(52) U.S. Cl. ....................................... 73/510; 73/514.32
(58) Field of Classification Search ............... 73/510, 73/511, 504.12, 504.04, 504.14, 514.32, 73/514.29, 514.33, 514.34, 514.36, 514.38
See application file for complete search history.

(56) References Cited

U.S. PATENT DOCUMENTS

| | | | | |
|---|---|---|---|---|
| 4,908,767 A | * | 3/1990 | Scholl et al. | 701/220 |
| 5,226,321 A | * | 7/1993 | Varnham et al. | 73/514.02 |
| 6,810,738 B2 | * | 11/2004 | Sakaguchi | 73/510 |
| 6,981,416 B2 | * | 1/2006 | Chen et al. | 73/510 |
| 7,533,569 B2 | * | 5/2009 | Sheynblat | 73/510 |
| 7,549,334 B2 | * | 6/2009 | Cardarelli | 73/504.13 |

FOREIGN PATENT DOCUMENTS

| | | |
|---|---|---|
| JP | 2004-301510 | 10/2001 |
| JP | 2004-294450 | 10/2004 |
| WO | 88/08522 | 3/1988 |
| WO | 91/10118 | 11/1991 |

* cited by examiner

*Primary Examiner* — Helen C. Kwok
(74) *Attorney, Agent, or Firm* — SNR Denton US LLP (57) ABSTRACT

An inertial sensor includes an oscillator that is supported by an elastic supporting member such that the oscillator is floating relative to a base and the oscillator is displaceable along a single axis, and a displacement detection unit detecting a displacement of the oscillator. The oscillation of the oscillator is a simple harmonic motion along a Z axis. An X axis, a Y axis, and the Z axis, serving as reference axes of an oscillation coordinate system for the oscillator, are shifted to provide x, y, and z axes, serving as new reference axes. Position coordinates of the oscillator of the x, y, and z axes are determined in at least two points during one period of the oscillator. A difference vector ($\Delta x$, $\Delta y$, $\Delta z$) is calculated on the basis of the determined position coordinates. An angular velocity or an acceleration is obtained using the difference vector.

5 Claims, 10 Drawing Sheets

FIG. 9

INERTIAL SENSOR AND ELECTRICAL OR ELECTRONIC DEVICE

CROSS REFERENCES TO RELATED APPLICATIONS

The present invention contains subject matter related to Japanese Patent Application JP 2007-097179 filed in the Japanese Patent Office on Apr. 3, 2007, the entire contents of which are incorporated herein by reference.

BACKGROUND OF THE INVENTION

1. Field of the Invention

The present invention relates to an inertial sensor that measures angular velocities about three axes and accelerations along the three axes and relates to an electrical or electronic device including the inertial sensor.

2. Description of the Related Art

In automobile and mechanical industries, there is a growing demand for sensors capable of accurately measuring a physical quantity, such as an acceleration or an angular velocity. In general, an object that moves freely in a three-dimensional space is acted upon by an acceleration in any direction and an angular velocity in any rotation direction. To accurately grasp the motion of the object, it is therefore necessary to measure an acceleration along each coordinate axis of an XYZ three-dimensional coordinate system and an angular velocity about each coordinate axis. Consequently, there is an increasing demand for multidimensional acceleration sensors and multiaxial angular velocity sensors having a compact size and high accuracy with low manufacturing cost.

Various multidimensional acceleration sensors have been proposed. For example, PCT Publication Nos. WO 88/08522, WO 91/10118, and WO 92/17759 disclose acceleration sensors for measuring an applied acceleration along each coordinate axis. The features of those acceleration sensors are as follows: Resistors, capacitors, and piezoelectric elements are arranged in predetermined positions in a flexible substrate of each sensor. An applied acceleration is measured on the basis of a change in resistance of each resistor, a change in capacitance of each capacitor, and a change in voltage generated by each piezoelectric element. A weight is arranged on the flexible substrate. When an acceleration acts on the sensor, a force is applied to the weight, so that the flexible substrate is deformed. The deformation is detected on the basis of a change in resistance, a change in capacitance, and a change in generated voltage described above, thus obtaining an acceleration component along each axis.

Multiaxial angular velocity sensors have rarely been reported in literatures and have not been put into practical use. Typical angular velocity sensors are used to measure an angular velocity about a power shaft of a vehicle. Accordingly, those angular velocity sensors each have a function of measuring an angular velocity about a specific axis. A one-dimensional angular velocity sensor is sufficient to obtain a rotational speed of such a power shaft. To obtain an angular velocity of an object that moves freely in a three-dimensional space, it is necessary to individually measure angular velocities about X, Y, and Z axes (hereinafter, also called the three axes) in the XYZ three-dimensional coordinate system. To measure an angular velocity about each of the three axes using a related-art one-dimensional angular velocity sensor, it is necessary to arrange the three related-art sensors in specific directions so that the sensors measure angular velocities about the three axes, respectively. Accordingly, the entire structure of an apparatus for obtaining angular velocities about the three axes is complicated and the manufacturing cost of the apparatus is expensive.

For example, Japanese Unexamined Patent Application Publication No. 2004-294450 discloses an angular velocity sensor capable of measuring angular velocities about the three axes. The sensor employs a method of moving a weight in a circle to measure angular velocities about the three axes, namely, two directions perpendicular to the tangent of the circle and one direction along the axis. To allow the weight to stably move in the circle in the angular velocity sensor, it is necessary to control a variation in 2-DOF structure and electrically control the sensor. However, those controls are difficult. Specifically, it is technically difficult to suppress noise caused by centrifugal separation and a disturbance acceleration. Disadvantageously, it is difficult to obtain the S/N ratio equivalent to that of a related-art angular velocity sensor.

Uniaxial and biaxial angular velocity sensors using microelectromechanical systems (MEMS) technology have been put into practical use. Two or three of those sensors can be used to achieve three-axial angular velocity measurement. For example, it is assumed that a three-axial acceleration sensor and a plurality of uniaxial angular velocity sensors are arranged to construct a three-axial angular velocity detecting apparatus. Disadvantageously, the apparatus has a size of several $cm^3$ or more in consideration of the structures of those sensors. Furthermore, it is technically difficult to simultaneously provide the directions of the X and Y axes and the direction of the Z axis. Accordingly, such a three-axial angular velocity detecting apparatus has not been realized.

SUMMARY OF THE INVENTION

The related-art angular velocity sensors employ a method of directly measuring a force applied perpendicularly to each axis. Disadvantageously, therefore, at least two simple harmonic oscillators are needed to measure angular velocities about the three axes. Alternatively, one oscillator has to be oscillated two-dimensionally.

The present invention focuses attention on a change in oscillation vector caused by application of an angular velocity. Accordingly, it is desirable to achieve measurement of angular velocities about three axes or accelerations along the three axes with a simple structure using at least one simple harmonic oscillator that oscillates along a single axis and exhibits a simple harmonic motion.

According to an embodiment of the present invention, an inertial sensor includes an oscillator that is supported by an elastic supporting member such that the oscillator is floating relative to a base and the oscillator is displaceable along a single axis, and a displacement detection unit that detects a displacement of the oscillator. The oscillation of the oscillator is a simple harmonic motion along a Z axis. An X axis, a Y axis, and the Z axis of a rectangular coordinate system, serving as reference axes of an oscillation coordinate system for the oscillator, are shifted to provide an x axis, a y axis, and a z axis, serving as reference axes of a new oscillation coordinate system. Position coordinates of the oscillator of the x, y, and z axes are determined in at least two points during one period of the oscillator. A difference vector ($\Delta x$, $\Delta y$, $\Delta z$) is calculated on the basis of the position coordinates of the x, y, and z axes determined in the two points. An angular velocity or an acceleration is obtained on the basis of the difference vector.

According to this embodiment of the present invention, the X, Y, and Z axes as the reference axes for detection of the oscillation direction of the oscillator are shifted to provide the x, y, and z axes, serving as new reference axes. The oscillation of the oscillator is a simple harmonic motion along the Z axis. Position coordinates of the oscillator of the x, y, and z axes are determined in at least two points during one period of the oscillator. A difference vector ($\Delta x$, $\Delta y$, $\Delta z$) is calculated on the basis of the determined position coordinates. An angular velocity or an acceleration is obtained on the basis of the difference vector. Accordingly, angular velocities about the three axes or accelerations along the three axes can be measured with a simple structure, namely, using the oscillator that oscillates along a single axis and exhibits a simple harmonic motion.

According to another embodiment of the present invention, an electrical or electronic device includes an inertial sensor that measures an angular velocity or an acceleration caused by the motion of the electrical or electronic device, the inertial sensor including an oscillator that is supported by an elastic supporting member such that the oscillator is floating relative to a base and the oscillator is displaceable along a single axis, and a displacement detection unit that detects a displacement of the oscillator. The oscillation of the oscillator is a simple harmonic motion along a Z axis. An X axis, a Y axis, and the Z axis of a rectangular coordinate system, serving as reference axes of an oscillation coordinate system for the oscillator, are shifted to provide an x axis, a y axis, and a z axis, serving as reference axes of a new oscillation coordinate system. Position coordinates of the oscillator of the x, y, and z axes are determined in at least two points during one period of the oscillator. A difference vector ($\Delta x$, $\Delta y$, $\Delta z$) is calculated on the basis of the position coordinates of the x, y, and z axes determined in the two points. An angular velocity or an acceleration is obtained on the basis of the difference vector.

According to the embodiment first described above, angular velocities about the three axes or accelerations along the three axes can be measured with the simple structure, namely, using the oscillator that oscillates along a single axis and exhibits a simple harmonic motion. Advantageously, this embodiment provides the inertial sensor smaller than related-art inertial sensors including a plurality of angular velocity detectors.

According to the embodiment second described above, the device includes the inertial sensor according to the embodiment first described above. Advantageously, a space for installing the inertial sensor can be reduced since the inertial sensor can be miniaturized.

DESCRIPTION OF THE PREFERRED EMBODIMENTS

An inertial sensor according to an embodiment of the present invention will now be described with reference to FIGS. 1 and 2.

Figure 1:
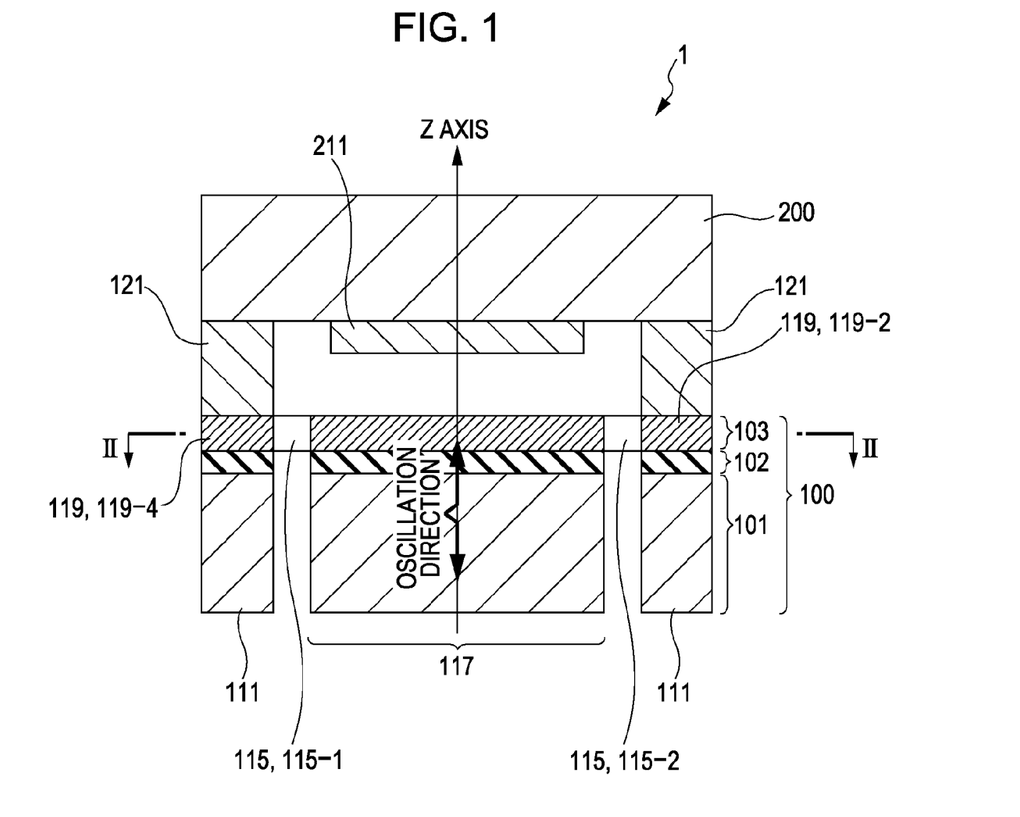
FIG. 1 is a schematic vertical sectional view of an inertial sensor according to an embodiment of the present invention.
Figure 2:
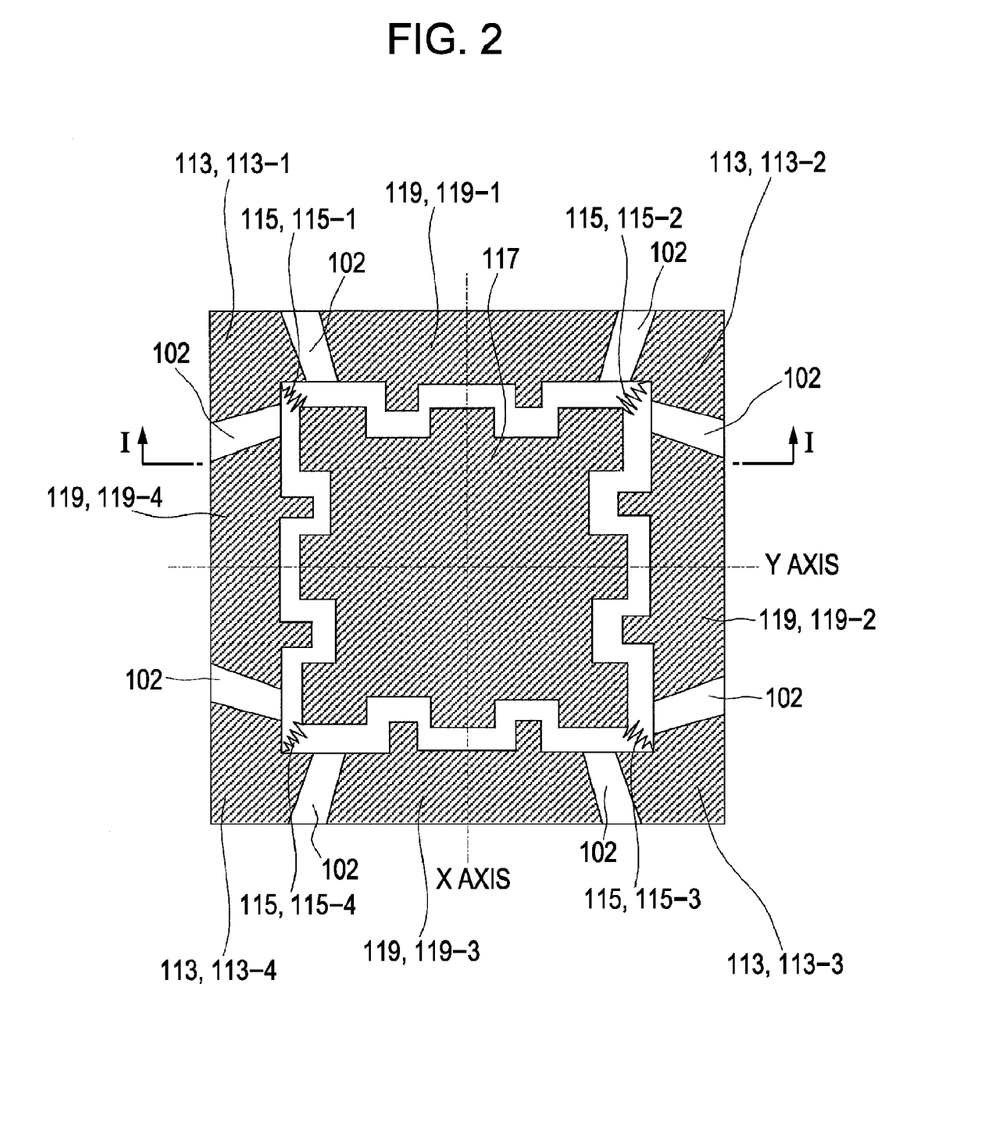
FIG. 2 is a schematic transverse sectional view of the inertial sensor according to the embodiment of the present invention.

FIG. 1 is a vertical sectional view of the inertial sensor including the line I-I in FIG. 2. FIG. 2 is a transverse sectional view thereof including the line II-II in FIG. 1. In the present embodiment, the inertial sensor including an electrostatic driving type oscillator exhibiting oscillation along a single axis will be explained as an example.

Referring to FIGS. 1 and 2, supports 113 (113-1 to 113-4) are arranged on a frame base 111. The base 111 is composed of, for example, a silicon substrate 101. The supports 113, composed of a silicon layer 103, are arranged at, for example, the respective corners of the base 111 with an insulating layer 102 therebetween. The supports 113 support an oscillator 117 through respective elastic supporting members 115 (115-1 to 115-4) so that the oscillator 117 can exhibit simple harmonic motion along a Z axis. In FIG. 2, the elastic supporting members 115 are schematically illustrated. The width and thickness of each elastic supporting member 115 and the number of folds thereof are adjusted so that the elastic supporting member 115 has the degree of freedom, namely, the elastic supporting members 115 is displaceable along the Z axis (the oscillation direction) and is appropriately displaceable in X and Y axes (the directions for detection). When oscillation has a speed, the oscillation is not limited to simple harmonic motion. In general, simple harmonic motion using the resonance characteristic of a structure is used as reference oscillation in terms of the simplicity of circuitry and the ease of manufacture. In the present embodiment, each elastic supporting member 115 is composed of, for example, the silicon layer 103 and functions as a spring using the elasticity of the silicon layer 103. The spring may have any shape. The oscillator 117 is constructed using a so-called silicon-on-insulator (SOI) substrate, serving as a laminate containing, for example, the silicon substrate 101, the insulating layer 102, and the silicon layer 103. In the following description, the SOI substrate will be termed a first substrate 100. The insulating layer 102, typically called a buried oxide (BOX) layer, comprises silicon oxide ($SiO_2$).

The base 111 is overlaid with detection electrodes 119 (119-1 to 119-4), with the insulating layer 102 therebetween. The detection electrodes 119 are arranged on the respective sides of the base 111 such that the detection electrode 119-1 is arranged between the supports 113-1 and 113-2, the detection electrode 119-2 is arranged between the supports 113-2 and 113-3, the detection electrode 119-3 is arranged between the supports 113-3 and 113-4, and the detection electrode 119-4 is arranged between the supports 113-4 and 113-1. The detection electrodes 119 are composed of, for example, the silicon layer 103.

A capacitance between the oscillator 117 and each of the detection electrodes 119 is measured, so that displacements of the oscillator 117 along x and y axes can be determined.

In the inertial sensor indicated at 1, the insulating layer 102 may be arranged on the upper surface of the base 111. In addition, the insulating layer 102 between each detection electrode 119 and the neighboring support 113 may be removed.

The oscillator 117 has recesses and the respective detection electrodes 119 have projections such that each recess is opposed to the corresponding projection. The distance between each recess and the corresponding projection is held so that the oscillator 117 is not come into contact with any of the detection electrodes 119 when the oscillator 117 oscillates.

To form the above-described structure, the silicon layer 103 in the SOI substrate is etched to form a frame portion for the base 111, the detection electrodes 119, and the elastic supporting members 115. At that time, the silicon layer 103 is etched to partially form the oscillator 117. Furthermore, the insulating layer 102 of the SOI substrate is etched and the silicon substrate 101 is etched to form the base 111, serving as a frame member, and the oscillator 117 composed of the SOI substrate. The above-described etching process employs, for example, deep reactive etching of silicon or wet etching using TMAH or KOH.

Furthermore, a frame 121 composed of a silicon layer is arranged on the insulating layer above the base 111.

In addition, a second substrate 200 is disposed on the frame 121. The second substrate 200 has an upper electrode 211 on the inner surface opposed to the oscillator 117. The upper electrode 211 and the oscillator 117 are arranged with an appropriate space therebetween so that the oscillator 117 is not come into contact with the upper electrode 211 upon the oscillation of the oscillator 117. The second substrate 200 is composed of, for example, a silicon substrate. When a silicon substrate is used to form the second substrate 200, it is preferred that an insulating layer (not shown) be arranged between the second substrate 200 and the upper electrode 211. The second substrate 200 may be composed of a glass substrate or a ceramic substrate. The upper electrode 211 may be a conductive material, such as gold (Au), aluminum (Al), or copper (Cu). From the viewpoint of the properties, a material having high conductivity, e.g., gold (Au) is preferably used. As for the above-described insulating layer, various insulating oxide layers, such as a silicon oxide ($SiO_2$) layer for insulation, are available.

The upper electrode 211 includes a drive electrode segment and a monitor electrode segment. When a voltage having a frequency equal to the resonance frequency in the direction of the Z axis of the oscillator 117 oscillatably held by the elastic supporting members is applied to the drive electrode segment, the oscillator 117 oscillates at a resonance frequency fz. At that time, a capacitance between the monitor electrode segment and the oscillator 117 is measured, so that the oscillation state in the direction of the Z axis can be monitored. In the inertial sensor 1, therefore, a displacement of the oscillator 117 along the Z axis (hereinafter, referred to as "Z-axial displacement") can be detected by the upper electrode 211 and displacements of the oscillator 117 along the X and Y axes (hereinafter, referred to as "X-axial displacement" and "Y-axial displacement") can be detected by the detection electrodes 119.

As for joining the frame 121 to the second substrate 200, various joining processes, e.g., joining using glass frit, joining by soldering, metal joining using gold (Au) or gold-tin (AuSn), joining of silicon (Si) to silicon (Si), and joining of silicon (Si) to silicon oxide ($SiO_2$) are available.

In the inertial sensor 1 with the above-described structure, the oscillation of the oscillator 117 is a simple harmonic motion along the Z axis. The X axis, the Y axis, and the above-described Z axis of the rectangular coordinate system, serving as the reference axes in the oscillation coordinate system of the oscillator 117, are shifted to provide x, y, and z axes, serving as reference axes of a new oscillation coordinate system. Position coordinates of the oscillator 117 of the x, y, and z axes are determined in at least two points during one period of the oscillator 117. On the basis of the position coordinates of the x, y, and z axes determined in the two points, a difference vector ($\Delta x$, $\Delta y$, $\Delta z$) is calculated. An angular velocity or an acceleration is measured using the difference vector. A method of measuring will be described in detail later.

The oscillator 117 of the inertial sensor 1 is driven so as to perform uniaxial oscillation. As for a method of driving the oscillator 117, various driving methods, such as static driving described above, electromagnetic driving, and piezoelectric driving, are available.

The principle of operation of the inertial sensor 1 will now be described.

A method of measuring an angular velocity will be first described.

An alternating voltage for driving the oscillator 117 at its resonance frequency is applied between the oscillator 117 and the upper electrode 211 including the drive electrode segment in the direction of, for example, the Z axis in the three-dimensional coordinate system to generate an electrostatic force between the oscillator 117 and the upper electrode 211, thus allowing the oscillator 117 to oscillate so as to periodically reciprocate along the Z axis.

At that time, when an angular velocity about, for example, the X axis in the three-dimensional coordinate system is applied, a Coriolis force $F_{coriolis}$ is generated along, for example, the Y axis in the three-dimensional coordinate system. The Coriolis force $F_{coriolis}$ is expressed by the following expression:

$$F_{coriolis}=2mv\omega$$

where m denotes the mass of the oscillator 117, v denotes an oscillation velocity in the driving direction, and $\omega$ denotes an externally applied angular velocity. When the oscillator 117 rotates about the Y axis at the angular velocity $\omega$, a Coriolis force F is similarly generated along the X axis.

Since a Coriolis force is generated in the direction perpendicular to the direction of oscillation, a Coriolis force is not generated in the oscillation direction in the principle. Accordingly, in related-art oscillation type angular velocity sensors, uniaxial oscillation enables measurement of angular velocities about two axes at a maximum, alternatively, two-dimensional oscillation (equivalent to simultaneous oscillations along two axes) enables measurement of angular velocities about three axes.

In the inertial sensor 1 according to the present embodiment of the present invention, the reference oscillation axes are set to new reference axes, i.e., the x, y, and z axes which are intentionally shifted from the three coordinate axes for detection of the oscillation direction by predetermined angles, respectively. Consequently, uniaxial reference oscillation alone enables simultaneous measurement of angular velocities about the three axes. It is preferred that the above-described x, y, and z axes form a rectangular coordinate system. As for the relationship between the reference oscillation axes and the coordinate axes for detection, it is the most preferable that the above-described z axis be set so as to pass through the coordinates (1, 1, 1) of the X, Y, and Z axes in the rectangular coordinates system. In this instance, Coriolis forces generated about the respective axes are equal to each other. When spring constants determining displacements caused by the Coriolis forces along the respective axes are not equal to each other, the arrangement of the z axis so as to pass through the coordinates (1, 1, 1) may not be the optimum arrangement in some cases. The optimum angle can be selected for each structure or detecting system.

Figure 3:
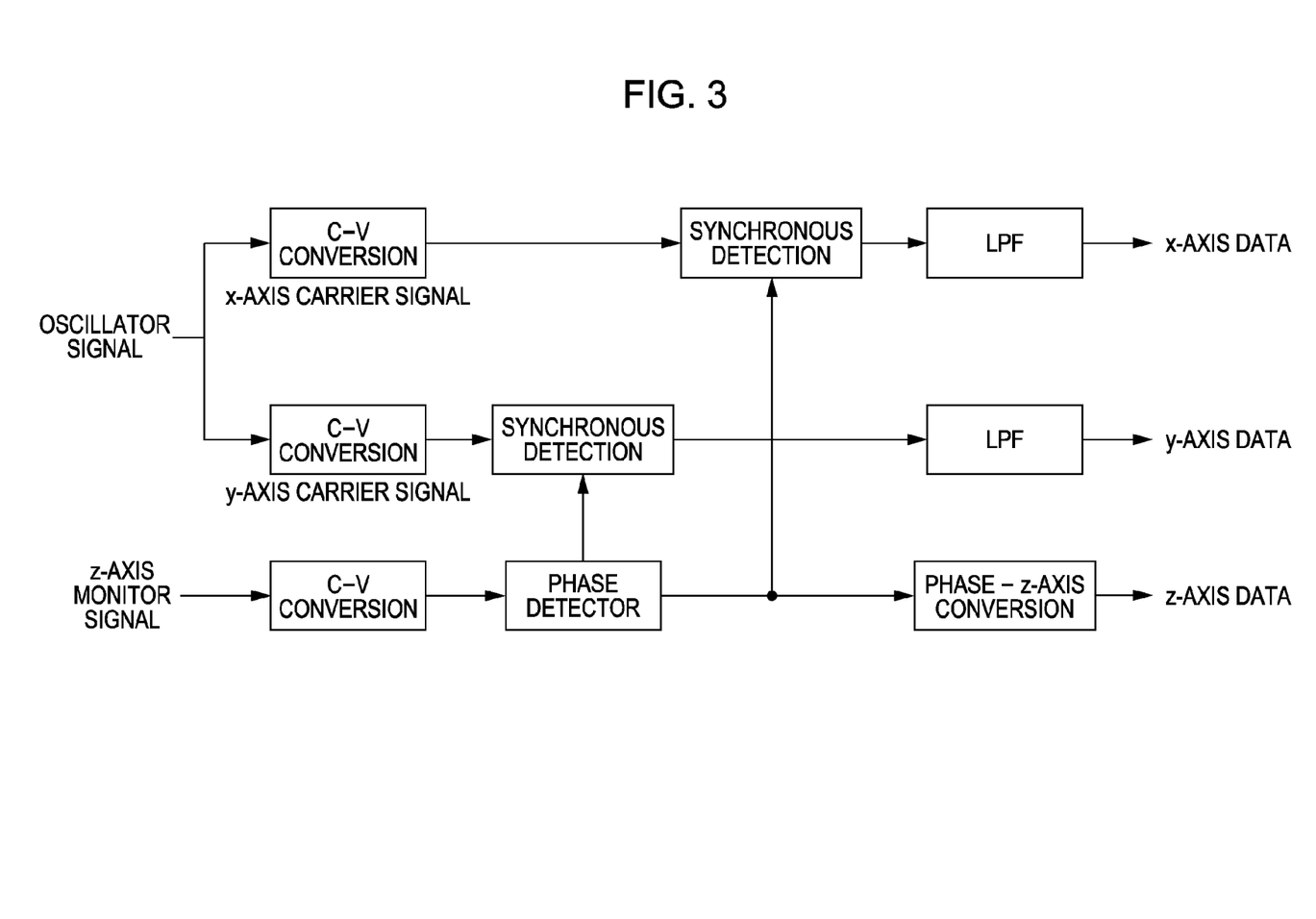
FIG. 3 is a block diagram of a detection circuit.

An example of a detection circuit will now be described with reference to FIG. 3. FIG. 3 is a block diagram of the detection circuit.

Referring to FIG. 3, carrier signals for detection are applied to, for example, the detection electrodes 119-1 and 119-3 (see FIG. 2), respectively, the carrier signals being 180 degrees out of phase and having the same voltage level. A capacitances measured on the basis of a displacement of the oscillator 117 (see FIG. 2) is amplified by performing capacitance to voltage (C-V) conversion on each of an x-axis carrier signal and a y-axis carrier signal, the x-axis carrier signal being synchronized with the carrier signals in the x axis and including a switching signal and a reference capacitance, the y-axis carrier signal being synchronized with the carrier signals in the y axis and including a switching signal and a reference capacitance. The amplified signals obtained as described above are subjected to synchronous detection using a signal (hereinafter, referred to as "monitor signal") obtained by monitoring the oscillation of the oscillator 117 to produce output signals. The output signals are allowed to pass through low-pass filters (LPFs), respectively, to produce x-axis data and y-axis data. On the basis of the monitor signal, z-axis data is obtained. Displacements along the x, y, and z axes are detected on the basis of the x-axis, y-axis, and z-axis data blocks. When the phase of a reference signal for synchronous detection is changed, a signal with any phase in the oscillation of the oscillator 117 can be detected. Obtaining the difference between the signals enables detection of a change between two any points during one period.

Obtaining a difference vector using an angular velocity will now be described below.

Applying a force in any direction in the above-described uniaxial oscillation changes the oscillation direction. Position coordinates are determined at any two or more sampling times t1, t2, t3, ... to obtain the differences between sampling periods, so that changes in oscillation can be measured as vectors. In particular, a change vector between two points during one period of the oscillator exhibiting periodic motion is obtained and the difference between a change vector upon application of a force and that without application of a force is obtained, so that a displacement due to the force is obtained as a difference vector.

In this instance, the direction of uniaxial oscillation is set along the z axis, directions that are perpendicular to the z axis and are perpendicular to each other, i.e., the x and y axes intersecting at 90 degrees are set, and the coordinate system is set to an xyz oscillation coordinate system. An XYZ detection coordinate system is set such that the detection coordinate system has the same origin point as that of the above-described oscillation coordinate system and the three axes, i.e., the X, Y, and Z axes are not superimposed on the above-described x, y, and z axes. An angle formed between the x and X axes, that between the y and Y axes, and that between the z and Z axes are indicated by $\alpha$, $\beta$, and $\theta$, respectively.

Assuming that the uniaxial oscillation is regarded as a simple harmonic motion passing through the origin point (0, 0, 0) between the coordinates (0, 0, −z0) and the coordinates (0, 0, z0) in the oscillation coordinate system, when any angular velocity is applied, the oscillation changes to an oscillation passing through the point at (x0, y0, 0) between the coordinates (0, 0, −z0) and the coordinates (0, 0, z0). This reason is as follows: When the oscillation has a maximum amplitude along the z axis in the oscillation coordinate system for simple harmonic motion, namely, when a position is at (0, 0, −z0) or (0, 0, z0), a velocity of 0 is measured. At that time, any Coriolis force is not generated. When z=0, a Coriolis force corresponding to a maximum velocity v0 is generated, so that a displacement is caused due to the Coriolis force.

In this instance, a difference vector in the oscillation coordinate system is expressed as $\vec{r}=(x0, y0, 0)$. As for the reference symbol "$\vec{r}$", r denotes a vector. The same applies to the following description.

When the difference vector is transformed to that in the detection coordinate system, the respective coordinates may be rotated by $-\alpha$, $-\beta$, and $-\theta$, respectively. The resultant vector is expressed by the following Expression (1):

$$\vec{r}=(dX, dY, dZ)=(x0, y0, 0)Rz(-\theta)Ry(-\beta)Rx(-\alpha) \qquad (1)$$

where Rx, Ry, Rz indicate the rotation matrices for the respective axes.

An example of the calculation of angular velocities about the respective axes using a difference vector will now be described below.

Figure 4:
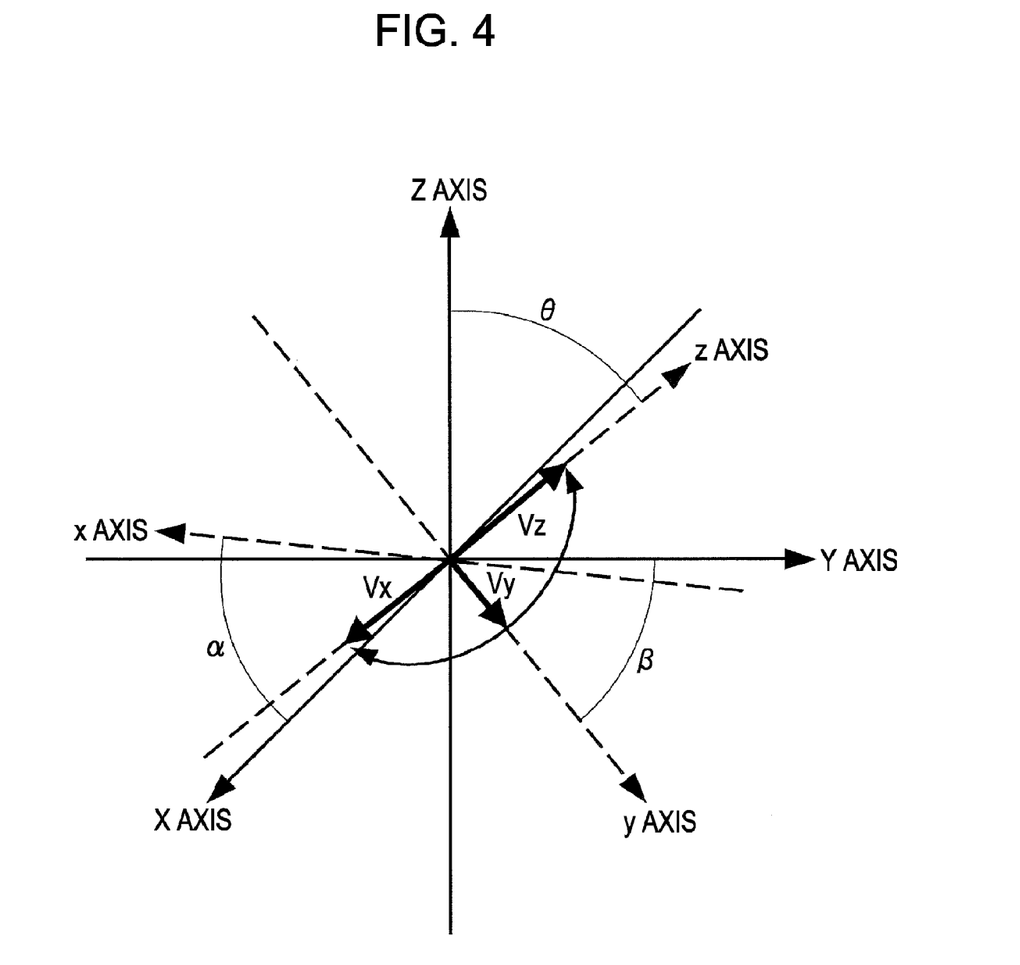
FIG. 4 is a diagram explaining coordinate axes.

A structure performing the above-described uniaxial oscillation is arranged so as to oscillate at predetermined angles relative to the X, Y, and Z axes for detection, preferably, the oscillator is arranged so as to oscillate in the direction passing through the point at (1, 1, 1) in this coordinate system, as shown in FIG. 4.

Let kx, ky, and kz be the apparent spring constants along the X, Y, and Z axes, let $\Omega=(\omega x, \omega y, \omega z)$ be an angular velocity applied to each axis in the detection coordinate system, and let V=(Vx, Vy, Vz) be a projected vector of driving oscillation to the detection coordinate axes.

A Coriolis force applied to the axis of oscillation is expressed by the following equation:

$$Fc=2m\Omega \times V=2m(\omega yVz-\omega zVy, \omega zVx-\omega xVz, \omega xVy-\omega yVx).$$

The following equations hold from a displacement due to the Coriolis force and Expression (1):

$$dX=2m/kx(\omega yVz-\omega zVy);$$

$$dY=2m/ky(\omega zVx-\omega xVz); \text{ and}$$

$$dZ=2m/kz(\omega xVy-\omega yVx).$$

The projected vector V=(Vx, Vy, Vz) in the driving oscillation may be arbitrarily set. Accordingly, the angular velocities $\Omega=(\omega x, \omega y, \omega z)$ can be obtained.

Let m be the mass of the oscillator 117 and let $\alpha$ be an acceleration in a predetermined direction applied on the oscillator 117. A force F=m$\alpha$ acts on the oscillator 117 in the same direction as that of the acceleration $\alpha$. A displacement x of each elastic supporting member 115 upon the application of the force is expressed as F=kx. Accordingly, x$\propto \alpha$. Consequently, the acceleration applied on the oscillator 117 can be obtained by detecting the displacements.

As described above, in the related-art methods of measuring an angular velocity, a force applied perpendicularly to each axis is directly obtained. Accordingly, the measurement of angular velocities about three axes needs at least two simple harmonic oscillators, or needs two-dimensional oscillation of a single oscillator. The present invention focuses attention on a change in oscillation vector upon application of an angular velocity. According to the present embodiment of the present invention, therefore, the inertial sensor 1 can measure angular velocities about three axes with a simple structure, i.e., using at least one simple harmonic oscillator that oscillates along a single axis and exhibits a simple harmonic motion.

The above-described inertial sensor 1 according to the present embodiment of the present invention is applicable to various electrical and electronic devices.

The inertial sensor 1 according to the present embodiment of the present invention can measure an acceleration. For example, the inertial sensor 1 can be applied to, for example, a mobile hard disk drive (hereinafter, abbreviated to "HDD"), mobile electronic devices including an HDD, such as a notebook personal computer, a mobile music player with a built-in HDD, a mobile music recorder/player with a built-in HDD and an HDD-equipped video camera, and mobile terminals, such as a mobile phone.

The above-described inertial sensor 1 can also be used for attitude control and motion detection. For example, the inertial sensor 1 can be applied to mobile image capturing devices, such as a video camera, a still camera, and an interchangeable lens for a camera, mobile terminals, such as a mobile phone, a user interface, a game console, and a game controller.

The inertial sensor 1 is also used for vibration control. For example, the inertial sensor 1 can be applied to a fully automatic washing machine, an automobile, and a vibration controller.

The inertial sensor 1 can also be used for motion detection. For example, the inertial sensor 1 can be applied to a pedometer, a security device, a disaster prevention device, and an antitheft device.

The inertial sensor 1 is also used for impact (collision) detection. For example, the inertial sensor 1 can be applied to a vehicle air back device, an accident recorder for a vehicle, ship, or airplane, and an HDD and also be applied to mobile electronic devices, such as a mobile HDD, a notebook personal computer, a mobile music player with a built-in HDD, a mobile music recorder/player with a built-in HDD, and an HDD-equipped video camera, and mobile terminals, such as a mobile phone.

As described above, the inertial sensor 1 according to the present embodiment of the present invention can be applied to electrical and electronic devices in various fields. An electrical or electronic device according to an embodiment of the present invention will be described below. The following description relates to an application of the inertial sensor 1 and the inertial sensor 1 is applicable to the above-described electrical and electronic devices.

Figure 5:
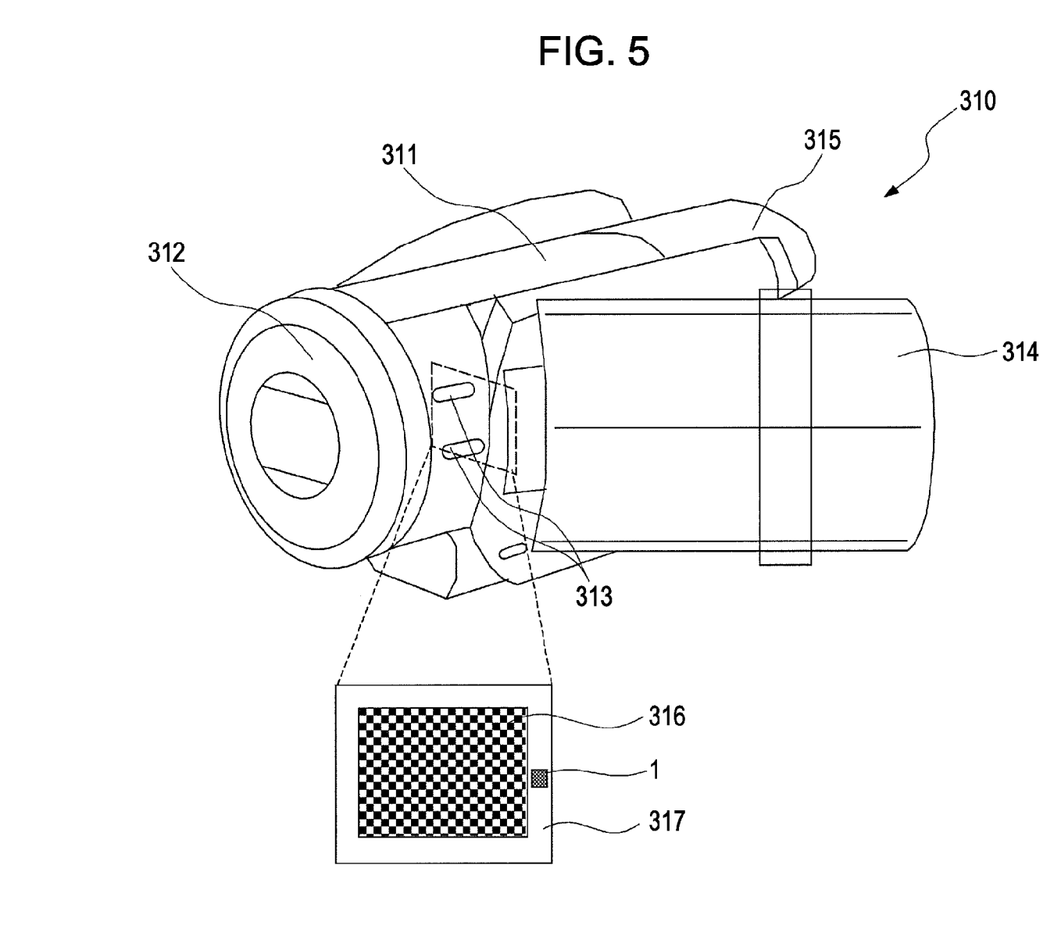
FIG. 5 is a schematic perspective view of a video camera, serving as an electrical or electronic device according to an embodiment (first application) of the present invention, FIG. 5 including a plan view of essential part of the video camera.

An electrical or electronic device according to an embodiment (first application) of the present invention will now be described below with reference to FIG. 5. FIG. 5 is a schematic perspective view of a video camera.

Referring to FIG. 5, the video camera, indicated at 310, according to the present application includes a body 311, an imaging lens 312 disposed on the side facing forward, start and stop switches 313 for shooting, a display unit 314, a finder 315, a recorder (not shown) for recording a captured image, an imaging device 316, such as a solid-state image sensor, a substrate 317 mounted with the imaging device 316, and an angular velocity sensor. The angular velocity sensor is disposed on the substrate 317. The inertial sensor 1 according to the foregoing embodiment of the present invention is used as the angular velocity sensor.

Figure 6A:
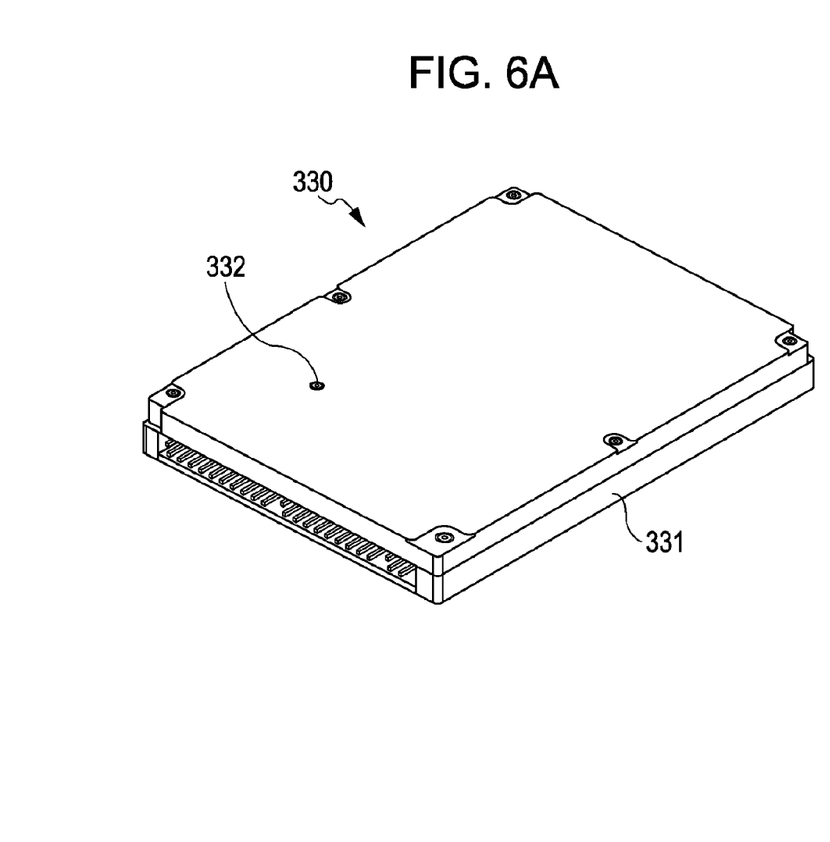
FIG. 6A is a schematic perspective view of a hard disk drive (HDD), serving as an electrical or electronic device according to another embodiment (second application) of the present invention.

An electrical or electronic device according to another embodiment (second application) of the present invention will be described below with reference to FIGS. 6A and 6B. FIG. 6A is a schematic perspective view of an HDD according to the present application and FIG. 6B is a plan view of the internal structure of the HDD.

Figure 6B:
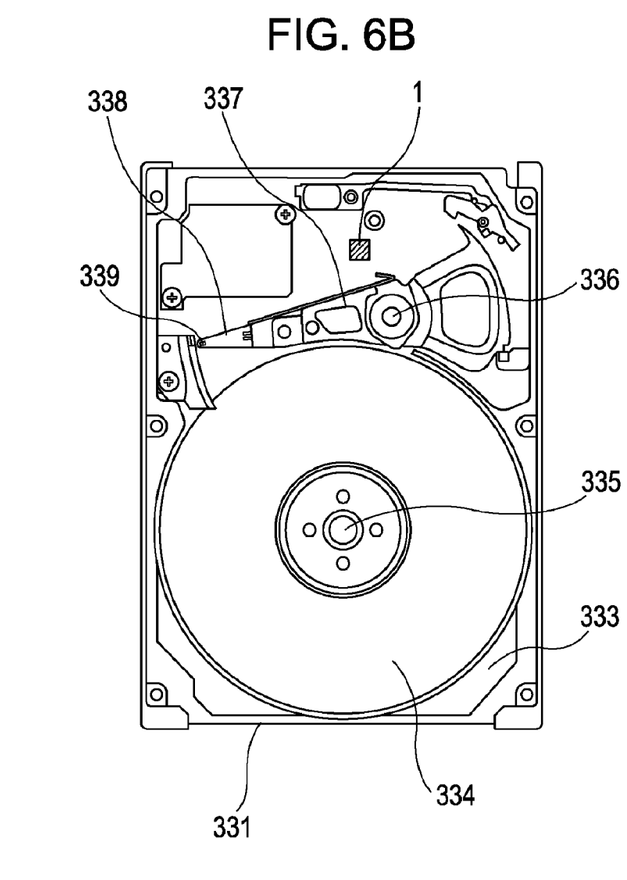
FIG. 6B is a plan view of the internal structure of the HDD.

Referring to FIGS. 6A and 6B, the HDD, indicated at 330, according to the present application has a base member 331 and a cover 332 that covers components arranged in the base member 331 and further includes a base substrate 333 disposed in the base member 331, a magnetic disk 334, a motor 335 that drives the magnetic disk 334, a shaft 336, an actuator arm 337 rotatably attached to the shaft 336, a head suspension 338, a magnetic head 339 arranged at the distal end of the actuator arm 337 through the head suspension 338, and the inertial sensor 1 on the base substrate 333. The inertial sensor 1 may be disposed on the base member 331 or the cover 332.

Figures 7A, 7B:
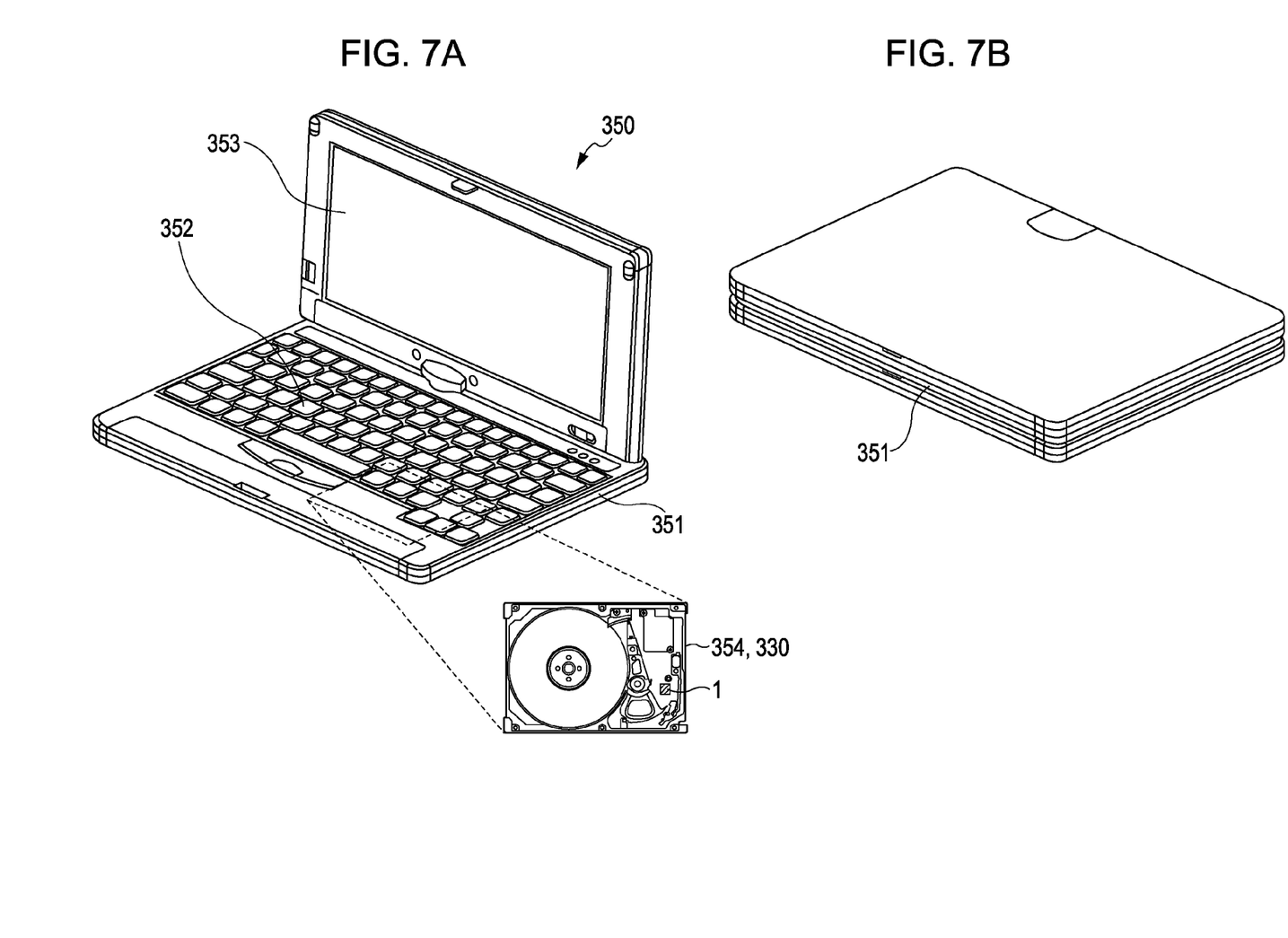
FIGS. 7A and 7B are schematic perspective views of a notebook personal computer, serving as an electrical or electronic device according to another embodiment (third application) of the present invention.

An electrical or electronic device according to another embodiment (third application) of the present invention will now be described with reference to FIGS. 7A and 7B. FIG. 7A is a schematic perspective view of a notebook personal computer including an HDD, the computer being opened to expose a display unit. FIG. 7B is a schematic perspective view of the notebook personal computer which is closed.

Referring to FIGS. 7A and 7B, the notebook personal computer, indicated at 350, according to the present application includes a body 351, a keyboard 352 that is operated when a user inputs characters, the display unit, indicated at 353, for displaying an image, and an HDD 354. The above-described HDD 330 mounted with the inertial sensor 1 according to the foregoing embodiment of the present invention is used as the HDD 354 in the notebook personal computer 350. The inertial sensor 1 may be disposed on a substrate (not shown) of the notebook personal computer 350 or may be arranged in an available space inside a housing which constitutes the body 351 and the display unit 353.

Figure 8:
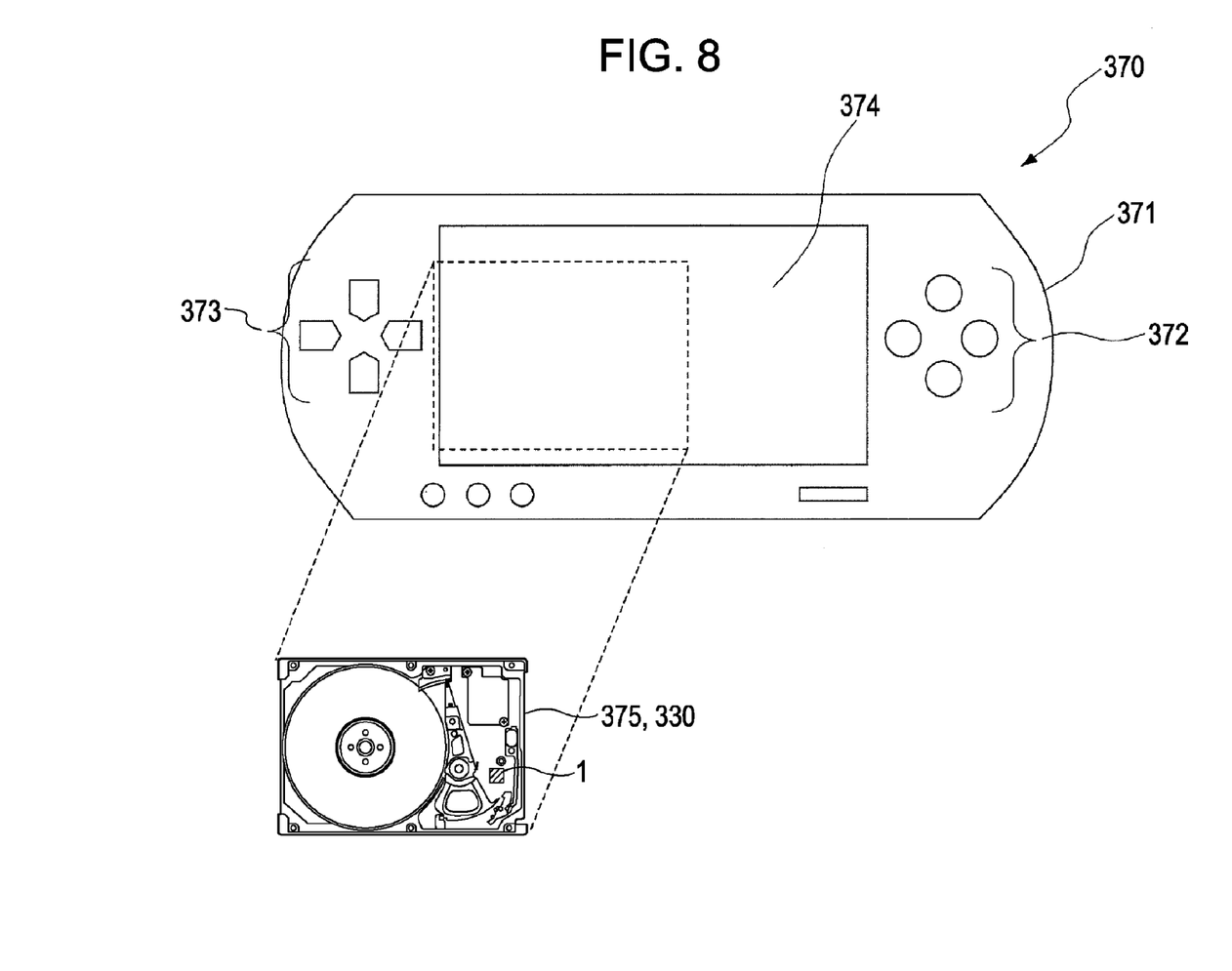
FIG. 8 is a plan view of a game console, serving as an electrical or electronic device according to another embodiment (fourth application) of the present invention.

An electrical or electronic device according to another embodiment (fourth application) of the present invention will now be described with reference to FIG. 8. FIG. 8 is a plan view of a game console including an HDD.

Referring to FIG. 8, the HDD-equipped game console, indicated at 370, according to the present application includes a body 371, a first operation-button group 372 and a second operation-button group 373 for operating, for example, a screen, a display unit 374 for displaying an image, and the HDD indicated at 375. The HDD 330 mounted with the above-described inertial sensor 1 according to the foregoing embodiment of the present invention is used as the HDD 375. The inertial sensor 1 may be disposed on a substrate (not shown) of the game console 370 or may be arranged in an available space inside a housing which constitutes the body 371.

Figure 9:
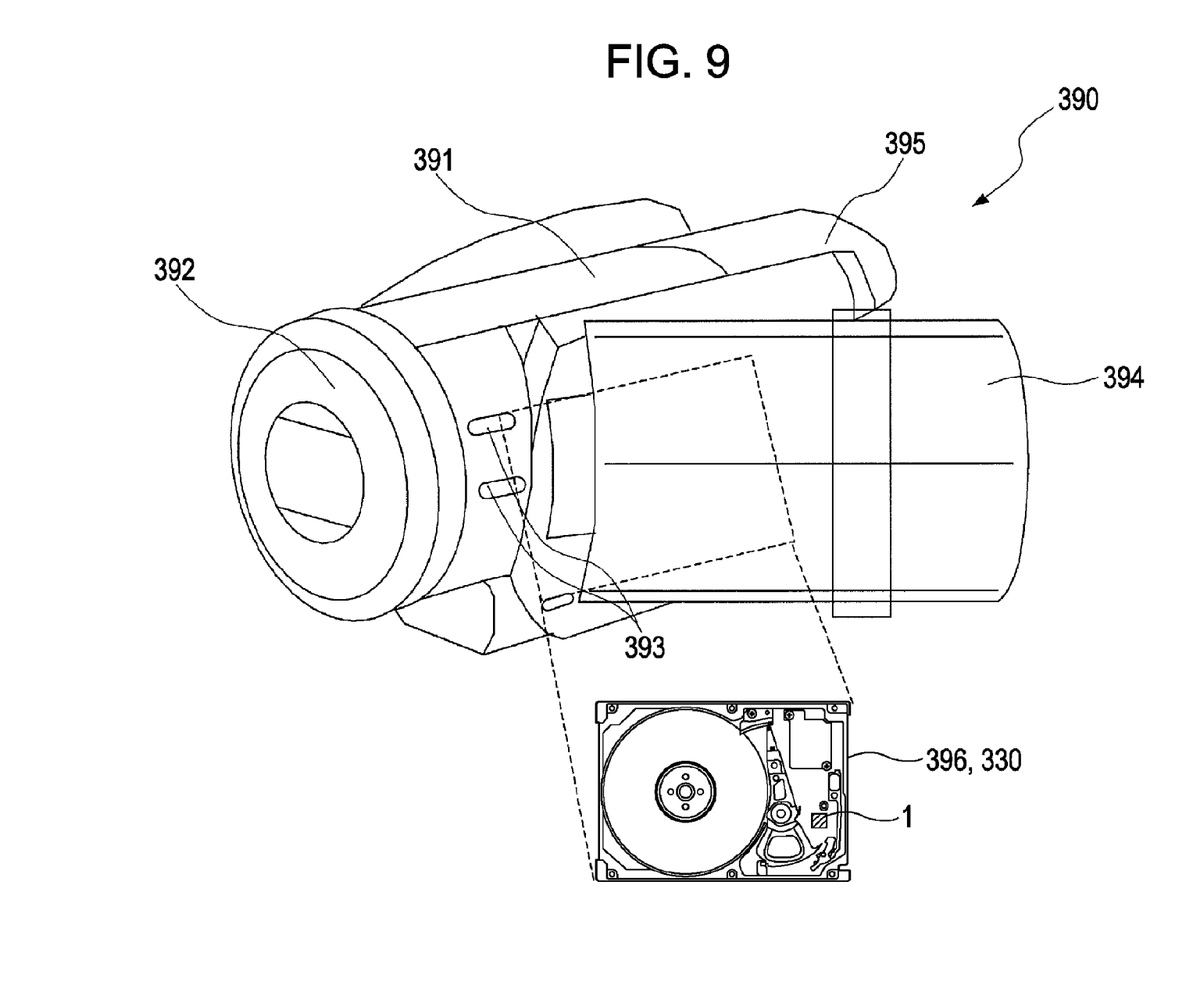
FIG. 9 is a schematic perspective view of a video camera, serving as an electrical or electronic device according to another embodiment (fifth application) of the present invention, FIG. 9 including a plan view of essential part of the video camera.

An electrical or electronic device according to another embodiment (fifth application) of the present invention will now be described with reference to FIG. 9. FIG. 9 is a schematic perspective view of an HDD-equipped video camera.

Referring to FIG. 9, the HDD-equipped video camera, indicated at 390, according to the present application includes a body 391, an imaging lens 392 disposed on the side facing forward, start and stop switches 393 for shooting, a display unit 394, a finder 395, and an HDD 396 for recording a captured image. The above-described HDD 330 including the inertial sensor 1 according to the foregoing embodiment of the present invention is used as the HDD 396. The inertial sensor 1 may be disposed on a substrate (not shown) of the video camera 390 or may be arranged in an available space inside a housing which constitutes the body 391.

Figure 10A:
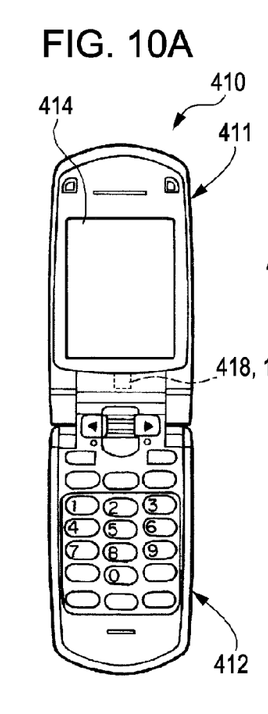
FIGS. 10A to 10G are diagrams illustrating a mobile phone, serving as an electrical or electronic device according to another embodiment (sixth application) of the present invention, FIG. 10A being a front view of the mobile phone which is opened, FIG. 10B being a side view thereof, FIG. 10C being a front view of the mobile phone which is closed, FIG. 10D being a left side view thereof, FIG. 10E being a right side view thereof, FIG. 10F being a top view thereof, FIG. 10G being a bottom view thereof.
Figure 10B:
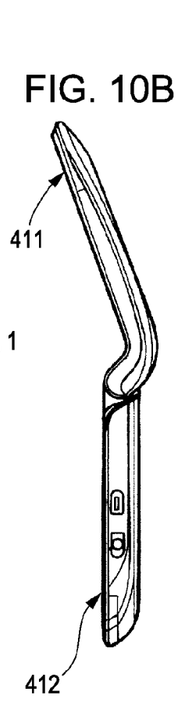
Figure 10C:
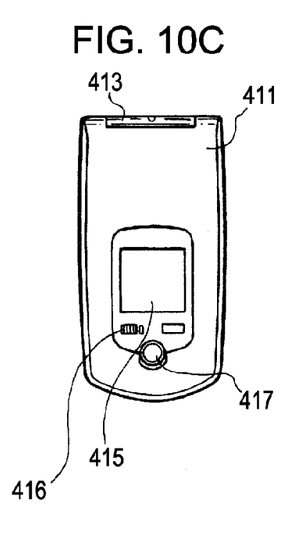
Figure 10D:
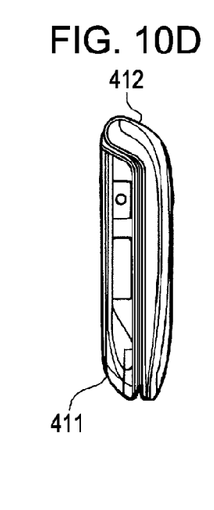
Figure 10E:
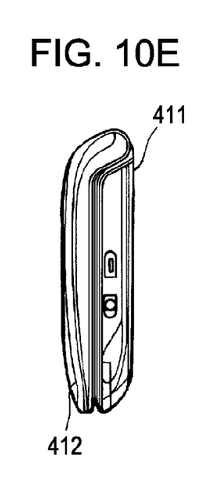
Figure 10F:
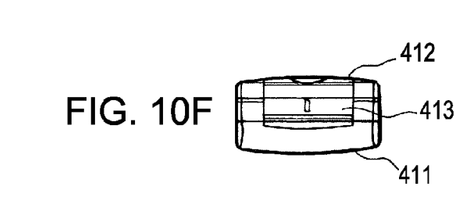
Figure 10G:
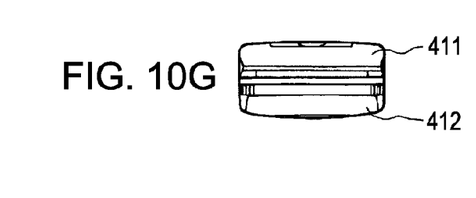

An electrical or electronic device according to another embodiment (sixth application) of the present invention will now be described with reference to FIGS. 10A to 10G. FIG. 10A is a front view of a camera-equipped mobile terminal, e.g., a camera-equipped mobile phone according to the present application, the mobile phone being opened. FIG. 10B is a side view of the opened mobile phone. FIG. 10C is a front view of the mobile phone which is closed. FIG. 10D is a left side view of the closed mobile phone, FIG. 10E is a right side view thereof, FIG. 10F is a tope view thereof, and FIG. 10G is a bottom view thereof.

Referring to FIGS. 10A to 10G, the mobile phone, indicated at 410, according to the present application includes an upper housing 411, a lower housing 412, a connector (in this case, a hinge) 413, a display 414, a sub-display 415, a picture light 416, a camera 417, and an angular velocity sensor 418. As the angular velocity sensor 418, the inertial sensor 1 according to the foregoing embodiment of the present invention is used. The inertial sensor 1 may be disposed in another position inside the upper housing 411 of the mobile phone 410 or may be arranged in an available space inside the lower housing 412.

Since the above-described electrical or electronic devices each include the inertial sensor 1 according to the foregoing embodiment of the present invention, the devices have advantages in that a space for installing the inertial sensor can be minimized because the inertial sensor can be miniaturized. Advantageously, the electrical or electronic devices of, in particular, the mobile type can be miniaturized.

It should be understood by those skilled in the art that various modifications, combinations, sub-combinations and alterations may occur depending on design requirements and other factors insofar as they are within the scope of the appended claims or the equivalents thereof.

What is claimed is:

1. An inertial sensor comprising:
    an oscillator that is supported by an elastic supporting member such that the oscillator is floating relative to a base and the oscillator is displaceable along a single axis; and
    a displacement detection unit that detects a displacement of the oscillator,
    wherein,
        an oscillation of the oscillator is a simple harmonic motion along a Z axis,
        an X axis, a Y axis, and the Z axis of a rectangular coordinate system, serving as reference axes of an oscillation coordinate system for the oscillator, are shifted to provide an x axis, a y axis, and a z axis, serving as reference axes of a new oscillation coordinate system,
        position coordinates of the oscillator of the x, y, and z axes are determined at at least two points during one period of the oscillator,
        a difference vector ($\Delta x, \Delta y, \Delta z$) is calculated on the basis of the position coordinates of the x, y, and z axes determined at the two points, and
        an angular velocity or an acceleration is obtained using the difference vector.

2. The inertial sensor according to claim 1, wherein the x, y, and z axes, serving as the new reference axes, are obtained by shifting the X, Y, and Z axes by an angle $\alpha$, an angle $\beta$, and an angle $\theta$, respectively, the X, Y, and Z axes serving as the reference axes for detection of the oscillation direction of the oscillator.

3. The inertial sensor according to claim 1, wherein the x, y, and z axes form a rectangular coordinate system.

4. The inertial sensor according to claim 1, wherein the z axis is arranged so as to pass through the coordinates (1, 1, 1) of the X, Y, and Z axes in the rectangular coordinate system.

5. An electrical or electronic device comprising:
    an inertial sensor that measures an angular velocity or an acceleration caused by the motion of the electrical or electronic device,
    wherein,
        the inertial sensor includes (a) an oscillator that is supported by an elastic supporting member such that the oscillator is floating relative to a base and the oscillator is displaceable along a single axis, and (b) a displacement detection unit that detects a displacement of the oscillator,
        an oscillation of the oscillator is a simple harmonic motion along a Z axis,
        an X axis, a Y axis, and the Z axis of a rectangular coordinate system, serving as reference axes of an oscillation coordinate system for the oscillator, are shifted to provide an x axis, a y axis, and a z axis, serving as reference axes of a new oscillation coordinate system,
        position coordinates of the oscillator of the x, y, and z axes are determined at at least two points during one period of the oscillator,
        a difference vector ($\Delta x, \Delta y, \Delta z$) is calculated on the basis of the position coordinates of the x, y, and z axes determined at the two points, and
        an angular velocity or an acceleration is obtained using the difference vector.

* * * * *